(12) United States Patent
Wang et al.

(10) Patent No.: US 12,095,194 B2
(45) Date of Patent: Sep. 17, 2024

(54) BOARD-TO-BOARD CONNECTOR AND METHOD FOR FORMING SAME

(71) Applicant: ZTE CORPORATION, Guangdong (CN)

(72) Inventors: Huaiqing Wang, Guangdong (CN); Anjun Chen, Guangdong (CN); Zhenzhi Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 370 days.

(21) Appl. No.: 17/626,492

(22) PCT Filed: Jun. 30, 2020

(86) PCT No.: PCT/CN2020/099096
§ 371 (c)(1),
(2) Date: Jan. 11, 2022

(87) PCT Pub. No.: WO2021/120580
PCT Pub. Date: Jun. 24, 2021

(65) Prior Publication Data
US 2022/0285873 A1    Sep. 8, 2022

(30) Foreign Application Priority Data
Dec. 20, 2019 (CN) .......................... 201911322788.7

(51) Int. Cl.
*H01R 12/71* (2011.01)
*H01R 4/28* (2006.01)
(Continued)

(52) U.S. Cl.
CPC ............. *H01R 13/405* (2013.01); *H01R 4/28* (2013.01); *H01R 12/55* (2013.01); *H01R 12/716* (2013.01); *H01R 43/20* (2013.01)

(58) Field of Classification Search
CPC ........ H01R 13/405; H01R 4/28; H01R 12/55; H01R 12/716; H01R 43/20; H01R 12/73;
(Continued)

(56) References Cited

U.S. PATENT DOCUMENTS 5,697,799 A    12/1997  Consoli et al.
7,591,669 B1    9/2009  Peng
(Continued)

FOREIGN PATENT DOCUMENTS

CN    201171124 Y    12/2008
JP    2011228309 A    11/2011

OTHER PUBLICATIONS

Extended European Search Report of European Patent Application No. 20902953.7 issued on Apr. 24, 2023.
(Continued)

*Primary Examiner* — Abdullah A Riyami
*Assistant Examiner* — Nelson R. Burgos-Guntin
(74) *Attorney, Agent, or Firm* — Li & Cai Intellectual Property (USA) Office

(57) ABSTRACT

A board-to-board connector comprises: a male end having at least three rows of male insert terminals; and a female end having at least three rows of female insert terminals, the number of rows of the female insert terminals being equal to the number of rows of the male insert terminals. A region on the male end near the middle row of male insert terminals is provided with a male end window, which is formed in an injection molding process by a clamping component for clamping the middle row of male insert terminals in a male end injection mold. A region on the female end near the middle row of female insert terminals is provided with a female end window, which is formed in an injection molding
(Continued)

process by a clamping component for clamping the middle row of female insert terminals in a female end injection mold.

12 Claims, 5 Drawing Sheets

(51) Int. Cl.
    *H01R 12/55*     (2011.01)
    *H01R 13/405*     (2006.01)
    *H01R 43/20*     (2006.01)

(58) Field of Classification Search
    CPC ...... H01R 43/24; H01R 13/02; H01R 13/639; B29C 45/14639
    See application file for complete search history.

(56) References Cited

U.S. PATENT DOCUMENTS

| | | | |
|---|---|---|---|
| 11,424,579 B2* | 8/2022 | Shimomura | H01R 12/716 |
| 2016/0190719 A1* | 6/2016 | Brzezinski | H01R 12/716 29/874 |
| 2017/0125930 A1* | 5/2017 | Komoto | H01R 13/405 |

OTHER PUBLICATIONS

International search report of PCT Patent Application No. PCT/CN2020/099096 issued on Aug. 27, 2020.

\* cited by examiner

BOARD-TO-BOARD CONNECTOR AND METHOD FOR FORMING SAME

CROSS-REFERENCE TO RELATED APPLICATIONS

The present application is a national phase application of PCT patent application No. PCT/CN2020/099096 filed on Jun. 30, 2020, which claims the priority of Chinese patent application CN201911322788.7, filed on Dec. 20, 2019 and entitled "Board-to-Board Connector and Method for Forming Same", which is incorporated herein by reference in its entirety.

FIELD OF THE INVENTION

The disclosure relates to, but not limited to the technical field of electronics, and in particular to a board-to-board connector and a method for forming such a board-to-board connector.

BACKGROUND OF THE INVENTION

A board-to-board connector (i.e., a B-B connector) is widely used in electronic products, and in particular in a mobile terminal electronic product such as a mobile phone. The main functions of the B-B connector are for connection between components, connection between printed circuit boards (i.e., PCBs), connection between a hard board and a soft board, etc., and for extending functions of a main PCB and enlarging the layout area. Further, the B-B connector can also realize a complex spatial environment, for example, difference in height, difference in orientation, etc.

As the functions of an electronic product continuously increases and the performance of the electronic product is continuously improved, in the case where the contour dimension of the product decreases and an internal layout space is limited, the intensity of devices also becomes higher. Therefore, there are more and more PINs required to be connected by the B-B connector. The conflict between reduction of the contour dimension of the B-B connector and the growing number of PINs is becoming serious. In this case, there is an urgent need for a solution with high area utilization.

An existing B-B connector typically uses the structure having an upper row and a lower row as shown in FIGS. 1 and 2, where FIG. 1 shows a female connector end, and FIG. 2 shows a male connector end. The lengthwise dimension of the connector in a left-right direction must be increased in order to increase the number of PINs. This leads to an increasingly larger occupation of a horizontal layout space on a PCB, which directly affects the utilization rate of the PCB. However, the length of the connector cannot be increased indefinitely. Once the number of PINs increases too dramatically, this would result in difficulty in the flatness control on an elongated connector due to structural and process limitation of the connector itself, which directly affects the PIN welding quality of the B-B connector, thus causing poor contact of the PINs.

SUMMARY OF THE INVENTION

In order to overcome existing problems or disadvantages, it is provided a board-to-board connector, which is applicable in an electronic product that needs a connector, and can meet an actual requirement for the connection of a great number of insert terminals under the condition of a small occupation space. In addition, it is also provided a method for forming a board-to-board connector.

In order to achieve the above and other objectives, an embodiment of the disclosure provides a method for forming a board-to-board connector. The method may include: forming a male end having at least three rows of male insert terminals; and forming a female end having at least three rows of female insert terminals. The number of rows of the female insert terminals is equal to the number of rows of the male insert terminals. A male end window is formed in a region, on the male end, close to the middle row of male insert terminals, and the male end window is formed, in an injection molding process, by a clamping component in a male end injection mold that is used for clamping the middle row of male insert terminals. A female end window is formed in a region, on the female end, close to the middle row of female insert terminals, and the female end window is formed, in an injection molding process, by a clamping component in a female end injection mold that is used for clamping the middle row of female insert terminals.

In an exemplary embodiment, the at least three rows of male insert terminals include: a first row of male insert terminals and a second row of male insert terminals, which are formed on opposite sides of the male end; and at least one row of male insert terminals that are formed at the male end and located between the first row of male insert terminals and the second row of male insert terminals. The middle row of male insert terminals is at least one row of male insert terminals.

In an exemplary embodiment, the at least three rows of female insert terminals include: a first row of female insert terminals and a second row of female insert terminals, which are formed on opposite sides of the female end; and at least one row of female insert terminals that are formed at the female end and located between the first row of female insert terminals and the second row of female insert terminals. The middle row of female insert terminals is at least one row of female insert terminals.

In an exemplary embodiment, two ends, which are located at two sides of the male end window, of the middle row of male insert terminals are respectively injected into a body of the male end.

In addition, an embodiment of the disclosure also provides a board-to-board connector. The connector includes a male end having at least three rows of male insert terminals, and a female end having at least three rows of female insert terminals. The number of rows of the female insert terminals is equal to the number of rows of the male insert terminals. A male end window is formed in a region, on the male end, close to the middle row of male insert terminals, and the male end window is formed, in an injection molding process, by a clamping component in a male end injection mold that is used for clamping the middle row of male insert terminals. A female end window is formed in a region, on the female end, close to the middle row of female insert terminals, and the female end window is formed, in an injection molding process, by a clamping component in a female end injection mold that is used for clamping the middle row of female insert terminals.

In an exemplary embodiment, the at least three rows of male insert terminals include: a first row of male insert terminals and a second row of male insert terminals, which are formed on opposite sides of the male end; and at least one row of male insert terminals that are formed at the male end and located between the first row of male insert terminals and the second row of male insert terminals. The middle row of male insert terminals is at least one row of male insert terminals.

In an exemplary embodiment, the at least three rows of male insert terminals include: a first row of female insert terminals and a second row of female insert terminals, which are formed on opposite sides of the female end; and at least one row of female insert terminals that are formed at the female end and located between the first row of female insert terminals and the second row of female insert terminals. The middle row of female insert terminals is at least one row of female insert terminals.

In an exemplary embodiment, two ends, which are located at two sides of the male end window, of the middle row of male insert terminals are respectively injected with the body of the male end integrally.

In an exemplary embodiment, the middle row of male insert terminals has contact arms that are located at the male end window, and two ends, which are located at two sides of the male end window, of each contact arm are respectively injected with the body of the male end integrally.

In an exemplary embodiment, the middle row of female insert terminals has contact arms that are exposed from the female end window.

DETAILED DESCRIPTION OF THE EMBODIMENTS

The preferred embodiments of the disclosure will be described in detail below in conjunction with the accompanying drawings. It should be noted that the preferred embodiments described below are merely used to illustrate and explain the embodiments of the disclosure, but not intended to limit the disclosure.

Figure 1:
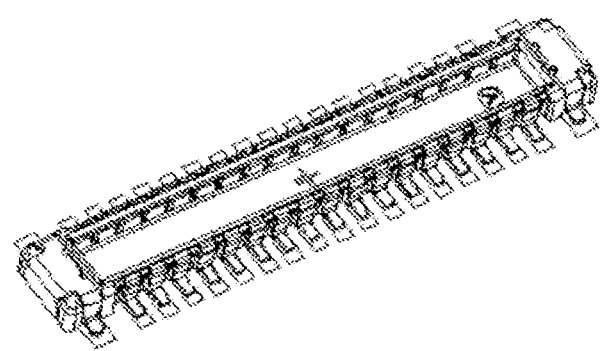
FIG. 1 is a structural schematic diagram of an existing board-to-board connector female end having two rows of female insert terminals.
Figure 2:
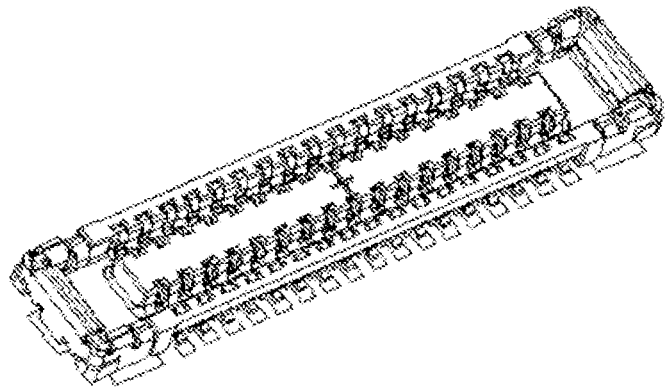
FIG. 2 is a structural schematic diagram of an existing board-to-board connector male end having two rows of male insert terminals.
Figure 3:
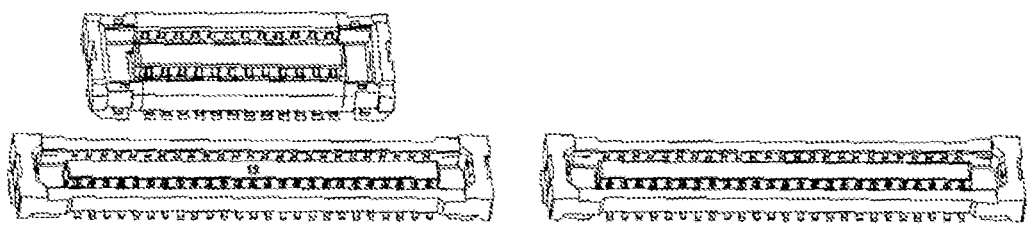
FIG. 3 is a schematic diagram of a board-to-board connector when the number of insert terminals increases.

In order to meet the requirement for multiple PINs, in an embodiment, the solution of connecting a plurality of B-B connectors as shown in FIG. 3 can be applied. However, the requirements of the B-B connectors for welding and assembly would result in great spatial occupation. In the case where the space is limited, this increases the difficulty in layout and wiring, resulting in a reduced spatial utilization rate of a PCB, which conflicts demands for product miniaturization.

In an embodiment of the disclosure, a board-to-board connector includes a male end having at least three rows of male insert terminals and a female end having at least three rows of female insert terminals. The number of rows of the female insert terminals is equal to the number of rows of the male insert terminals. A male end window is formed in a region, on the male end, close to the middle row of male insert terminals, and the male end window is formed, in an injection molding process, by a clamping component in a male end injection mold that is used for clamping the middle row of male insert terminals. A female end window is formed in a region, on the female end, close to the middle row of female insert terminals, and the female end window is formed, in an injection molding process, by a clamping component in a female end injection mold that is used for clamping the middle row of female insert terminals.

In an exemplary embodiment, the board-to-board connector of the disclosure may have three, four or more rows of insert terminals. The structure of the board-to-board connector of the disclosure will be described below in details in conjunction with several embodiments.

Embodiment One

Figure 10:
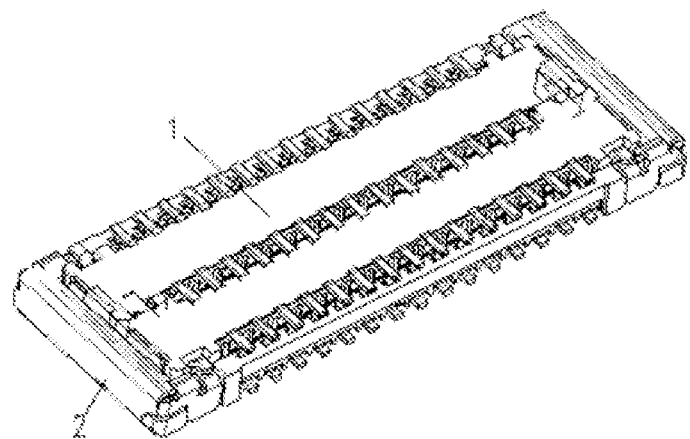
FIG. 10 is a perspective view of a board-to-board connector after a male end and a female end are assembled in an embodiment of the disclosure.
Figure 11:
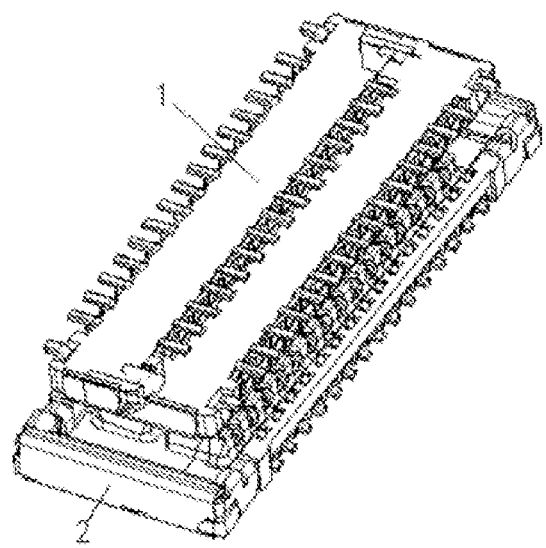
FIG. 11 is a perspective view of a board-to-board connector when a male end and a female end are to be assembled in an embodiment of the disclosure.
Figure 12:
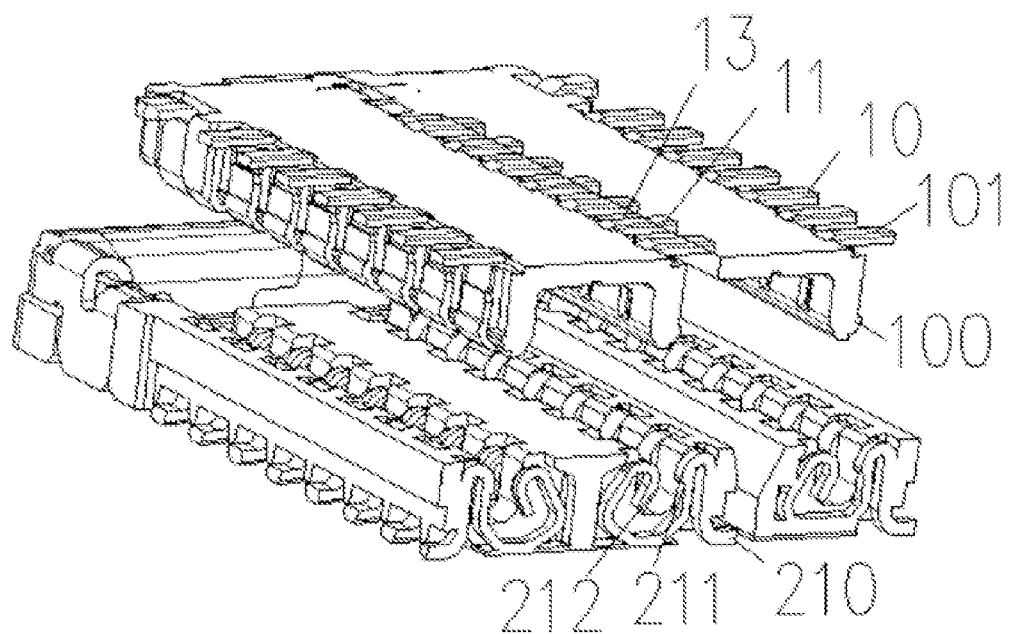
FIG. 12 is a cross-sectional view of a board-to-board connector when a male end and a female end are to be assembled in an embodiment of the disclosure.

As shown in FIGS. 10 to 12, in the embodiment, a board-to-board connector having three rows of insert terminals includes a male end having at least three rows of male insert terminals and a female end having at least three rows of female insert terminals. A male end window is formed in a region, on the male end, close to the middle row of male insert terminals, and the male end window is formed, in an injection molding process, by a clamping component in a male end injection mold that is used for clamping the middle row of male insert terminals. A female end window is formed in a region, on the female end, close to the middle row of female insert terminals, and the female end window is formed, in an injection molding process, by a clamping component in a female end injection mold that is used for clamping the middle row of female insert terminals.

Figure 8:
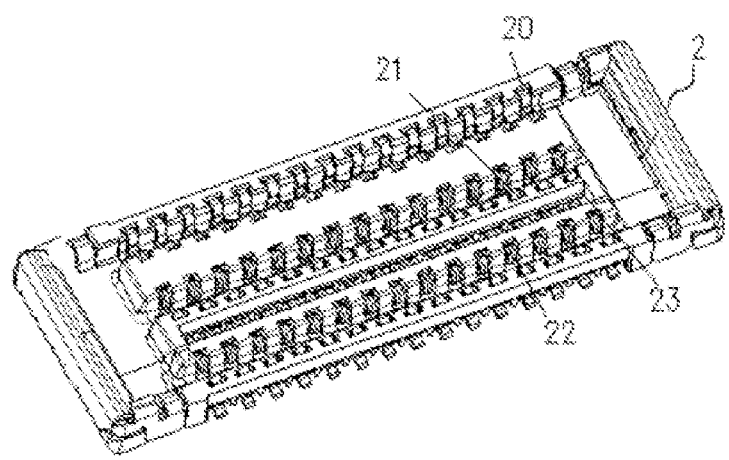
FIG. 8 is a perspective view from one viewing angle of a board-to-board connector female end in an embodiment of the disclosure.
Figure 9:
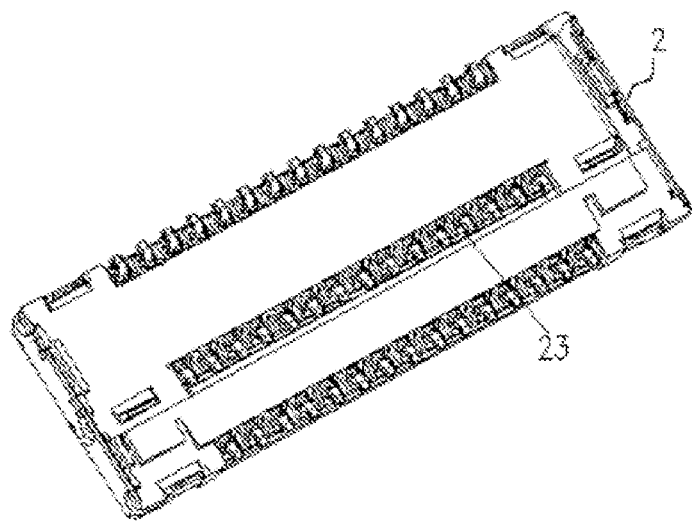
FIG. 9 is a perspective view from another viewing angle of a board-to-board connector female end in an embodiment of the disclosure.

For example, the board-to-board connector of the embodiment includes a male end 1 and a female end 2. In an exemplary embodiment, the male end 1 adopts the structure as shown in FIGS. 4, 6 and 7, and the female end 2 adopts the structure as shown in FIGS. 5, 8 and 9.

Figure 4:
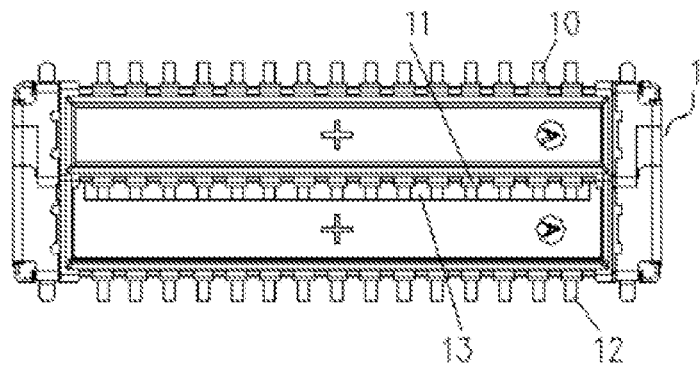
FIG. 4 is a structural schematic diagram of a board-to-board connector male end in an embodiment of the disclosure.
Figure 5:
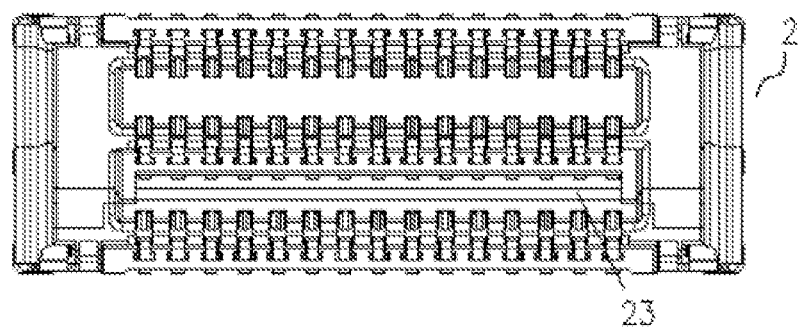
FIG. 5 is a structural schematic diagram of a board-to-board connector female end in an embodiment of the disclosure.
Figure 6:
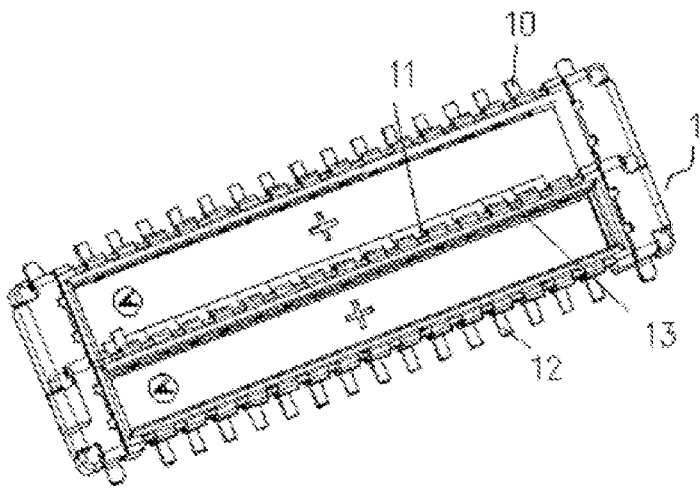
FIG. 6 is a perspective view from one viewing angle of a board-to-board connector male end in an embodiment of the disclosure.
Figure 7:
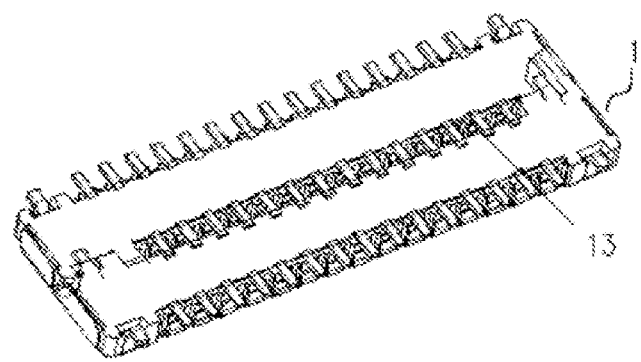
FIG. 7 is a perspective view from another viewing angle of a board-to-board connector male end in an embodiment of the disclosure.

As shown in FIGS. 4, 6 and 7, the male end 1 of the embodiment has a body and male insert terminals. Three rows of male inserts terminals in parallel with one another are arranged on the body, and the three rows of male insert terminals include: a first row of male insert terminals 10 and a second row of male insert terminals 12, which are formed on opposite sides of the body; and a middle row of male insert terminals 11 that are formed at the body and located between the first row of male insert terminals and the second row of male insert terminals. Each row of male insert terminals includes a plurality of male insert terminals arranged in parallel.

A male end window 13 is formed in a region, on the body of the male end 1, close to the middle row of male insert terminals 11, and the male end window 13 is formed, in an injection molding process, by a clamping component in a male end injection mold that is used for clamping the middle row of male insert terminals.

The middle row of male insert terminals includes a plurality of male insert terminals arranged in parallel, and therefore, the male end window 13 located close to the middle row of male insert terminals also includes a plurality of small windows arranged at intervals, that is, there is a male insert terminal between adjacent small windows.

The male end window provided in the body of the male end may extend through the thickness of the body, such that an improved machining process for the middle row of male insert terminals, and the strength and reliability of the welding between the male insert terminals and corresponding pads on a circuit board can be ensured.

During manufacturing, two ends, which are located at two sides of the male end window, of the middle row of male insert terminals are lapped into the body, i.e., being injected with the body integrally. For example, as shown in FIG. 12, each male insert terminal in the three rows of male insert terminals of the embodiment includes a contact arm 101 for electrically connecting to a circuit board (not shown) adapted to the male end, and a conduction arm 100, which is perpendicular to the contact arm 101 and is used for electrically connecting to the female end 2.

For the middle row of male insert terminals, each of the contact arms 101 thereof is located between adjacent small windows in the male end window, and two ends, which are located at two sides of respective small window, of the contact arm 101 are respectively injected with the body integrally. The utilization of such a structure can ensure the strength of the body of the male end when provided with the male end window, and the reliability of the insert terminals adaptive to multiple times of plugging of the male end and the female end, thereby effectively preventing the male end window from being the weakest part with respect to stress concentration.

As shown in FIGS. 5, 8 and 9, the female end 3 of the embodiment has a body and female insert terminals. Three rows of female insert terminals in parallel with one another are arranged on the body of the female end 3, the three rows of male insert terminals include: a first row of female insert terminals 20 and a second row of female insert terminals 22, which are formed on opposite sides of the body; and a middle row of female insert terminals 21 that are formed on the body and located between the first row of female insert terminals 20 and the second row of female insert terminals 22.

A female end window 23 is formed in a region, on the body of the female end 2, close to the middle row of female insert terminals 21, and the female end window 23 is formed, in an injection molding process, by a clamping component in a female end injection mold that is used for clamping the middle row of female insert terminals 21.

The middle row of female insert terminals 21 includes a plurality of female insert terminals arranged in parallel, and therefore, the female end window 23 located close to the middle row of female insert terminals is also isolated into a plurality of small windows by the plurality of female insert terminals 21.

Similarly, the female end window provided in the body of the female end may extend through the thickness of the body, such that an improved machining process for the middle row of female insert terminals, and the strength and reliability of the welding between the female insert terminals and corresponding pads on a circuit board can be ensured.

As shown in FIG. 12, each male insert terminal in the three rows of male insert terminals of the embodiment includes a contact arm 210 for electrically connecting to a circuit board (not shown) adapted to the female end, and a conduction arm 212, which is connected to the contact arm 210 by means of a connection arm 211 and is used for electrically connecting to the conduction arm 100 of the male end 1.

During manufacturing, the contact arm 210 of each female insert terminal 21 in the middle row is located at the female end window 23, that is, the contact arm 210 of each female insert terminal 21 is exposed from the female end window 23, the female end window 23 is isolated into a plurality of small windows by means of the plurality of contact arms 210, and part of the connection arm 211 that is connected to the contact arm 210 is injected with the body integrally. In an exemplary embodiment, the contact arms of the female insert terminals are arranged in parallel with the contact arms of the male insert terminals adapted to the female insert terminals. Similarly, the utilization of such a structure can ensure the strength of the body of the female end when provided with the female end window, and the reliability of the insert terminals adaptive to multiple times of plugging of the female end and the male end, thereby effectively preventing the female end window from being the weakest part with respect to stress concentration.

Figure 13:
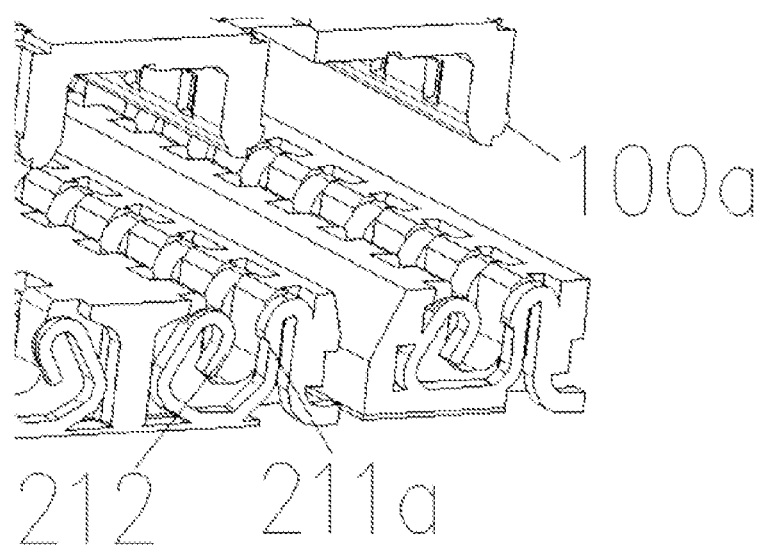
FIG. 13 is a partially enlarged view of a board-to-board connector when a male end and a female end are to be assembled in an embodiment of the disclosure.

In order to ensure reliable electrical connection between the male insert terminals and the female insert terminals that correspond to each other after the male end 1 and the female end 2 are plugged into each other, and effectively prevent inadvertent release after the connection, the embodiment further includes an anti-release structure as shown in FIGS. 12 and 13. The anti-release structure includes: outwardly protruding blocks 110*a*, which are arranged at the bottom ends of the conduction arms 100 of the female insert terminals; and inwardly recessed grooves 211*a*, which are arranged on the connection arms 211 of the female insert terminals. When the male end is inserted into the female end, the outwardly protruding blocks 100*a* are exactly engaged with the inwardly recessed grooves 211*a*, thereby preventing inadvertent release.

In addition, the conduction arms 212 of the female insert terminals of the embodiment have barb portions each having a certain angle of inclination with respect to the extension direction of respective conduction arm 212, which can also effectively prevent inadvertent release after the male insert terminals and the female insert terminals are plugged into each other.

In an exemplary embodiment, when the male end 1 is plugged onto the female end 2, the barb portions of the female insert terminals on the female end 2 can form conductive contacts for abutting against the conduction arms of the corresponding male insert terminals on the male end 1, such that a circuit connection is achieved.

The male insert terminals and the female insert terminals of the embodiment can also take other structural forms known in the art in addition to the above structures, as long as the male insert terminals and the female insert terminals are lapped with each other and form a reliable circuit connection.

Other parts of the connector of the embodiment can also adopt known structures in addition to the above structures, which will not be repeatedly described herein.

For the board-to-board connector of the disclosure, when it is necessary to increase the number of insert terminals of the connector, the number of rows of insert terminals is increased by extending the width of the connector, without the need for unilaterally increase the lengthwise size of the connector. In this way, the flatness of a surface mounted technology (SMT) patch mounted by the connector is strengthened. Moreover, the number of engaged rows is increased, thereby enhancing an interlocking force between the male end and the female end, and improving the reliability of the contact between the male end and the female end of the board-to-board connector. In particular, a window is provided in a part of each of the male end and the female end, thereby improving a production and machining process, and facilitating the mold machining and welding inspection of the middle row of insert terminals.

Embodiment Two

The embodiment provides a board-to-board connector having four rows of insert terminals (not shown), and differs from the Embodiment One in that four rows of male insert terminals are arranged on the male end. Illustratively, middle rows of male insert terminals including two rows of male insert terminals are also arranged in the middle of the board-to-board connector according to the embodiment, in addition to two rows of male insert terminals arranged on opposite sides of the male end. A male end window is provided at each row of male insert terminals of the middle rows of male insert terminals. The contact arms of the row of male insert terminals are exposed from the window, and two ends, at two sides of the window, of each contact arm are injected into a body.

Correspondingly, four rows of female insert terminals are arranged on the female end, and middle rows of female insert terminals including two rows of female insert terminals are also arranged in the middle of the body of the female end. A female end window is provided at each row of female insert terminals of the middle rows of female insert terminals. The contact arms of the row of male insert terminals are exposed from the window.

Embodiment Three

In addition to the above board-to-board connector, the disclosure further provides a method for forming a board-to-board connector, the method including the following steps.

A male end having at least three rows of male insert terminals is formed.

A female end having at least three rows of female insert terminals is formed. The number of rows of female insert terminals is equal to the number of rows of male insert terminals.

A male end window is formed in a region, on the male end, close to the middle row of male insert terminals, and the male end window is formed, in an injection molding process, by a clamping component in a male end injection mold that is used for clamping the middle row of male insert terminals.

A female end window is formed in a region, on the female end, close to the middle row of female insert terminals, and the female end window is formed, in an injection molding process, by a clamping component in a female end injection mold that is used for clamping the middle row of female insert terminals.

Further, in the step of forming the male end having at least three rows of male insert terminals, the at least three rows of male insert terminals include:

a first row of male insert terminals and a second row of male insert terminals, which are formed on opposite sides of the male end; and at least one row of male insert terminals that are formed on the male end and located between the first row of male insert terminals and the second row of male insert terminals.

The middle row of male insert terminals is at least one row of male insert terminals.

In the step of forming the female end having at least three rows of female insert terminals, the at least three rows of female insert terminals include:

a first row of female insert terminals and a second row of female insert terminals, which are formed on opposite sides of the female end; and at least one row of female insert terminals that are formed on the female end and located between the first row of female insert terminals and the second row of female insert terminals.

The middle row of female insert terminals is at least one row of female insert terminals.

In an exemplary embodiment, the contact arms of the middle row of male insert terminals are located at the male end window, and two ends, which are located at two sides of the male end window, of each contact arm are respectively injected into the body of the male end. The contact arms of the middle row of female insert terminals are exposed from the female end window.

In the embodiments of the disclosure, the male end and the female end are formed by means of an injection molding method. During injection molding, a corresponding male end injection mold and a corresponding female end injection mold are used. The structure of the male end injection mold or the female end injection mold are substantially similar to that of a corresponding injection mold in an existing technique, except for that one or more rows of one or more clamping components for clamping insert terminals are also arranged in the middle of the corresponding injection mold, and the corresponding window mentioned above is automatically formed by using the clamping component during an injection molding process. In this way, while increasing the number of insert terminals, and facilitating the inspection of welding reliability of insert terminals through a window, die machining can be facilitated, and an application range of a connector can be enlarged.

The structure of the board-to-board connector formed according to the embodiment is as described in the Embodiments One and Two, and will not be described in details here.

The board-to-board connector and the method for forming same according to the embodiments of the disclosure have the following advantages.

In the board-to-board connector according to the embodiments of the disclosure, there are at least three rows of insert terminals. Therefore, the number of insert terminals is doubled and redoubled by appropriately extending the width of the board-to-board connector, such that an interlocking force between the male end and the female end can be enhanced, and the reliability of contact between the male end and the female end can be improved. Since insert terminals are realized on the same board-to-board connector, the distance between rows can be minimum, and compared with an existing technique using a couple of two-row board-to-board connectors having the same specification to increase the number of insert terminals, the space utilization rate can be greatly improved.

In the board-to-board connector according to the embodiments of the disclosure, a transparent window is added at a middle row of insert terminals, such that the welding strength of the middle row of insert terminals can be ensured, and inspection and maintenance of welding reliability can also be performed.

In the board-to-board connector according to the embodiments of the disclosure, a transparent window is formed at the middle row of insert terminals in an injection molding process by a clamping component in a mode that is used for clamping the middle row of insert terminals, such that a welding inspection of the middle row of insert terminals can be facilitated, and a production and machining process can also be improved, facilitating mode machining for the middle row of insert terminals.

Although the disclosure is described above in details, the disclosure is not limited to these, and those skilled in the art can make modifications according to the principles of the disclosure. Therefore, various modifications made according to the principles of the disclosure all should be considered as falling within the scope of the disclosure.

What is claimed is:

1. A method for forming a board-to-board connector, comprising:
    forming a male end having at least three rows of male insert terminals; and
    forming a female end having at least three rows of female insert terminals, wherein the number of rows of the female insert terminals is equal to the number of rows of the male insert terminals;
    a male end window is formed in a region, on the male end, close to the middle row of male insert terminals, and the male end window is formed, in an injection molding process, by a clamping component in a male end injection mold that is used for clamping the middle row of male insert terminals; and
    a female end window is formed in a region, on the female end, close to the middle row of female insert terminals, and the female end window is formed, in an injection molding process, by a clamping component in a female end injection mold that is used for clamping the middle row of female insert terminals,
    wherein each male insert terminal in the middle row of male insert terminals extends from one side of the male end window to another side of the male end window, and two ends, which are located at two sides of the male end window, of each male insert terminal are respectively injected into a body of the male end.

2. The method of claim 1, wherein the at least three rows of male insert terminals comprises:
    a first row of male insert terminals and a second row of male insert terminals, which are formed on opposite sides of the male end; and
    at least one row of male insert terminals that are formed at the male end and located between the first row of male insert terminals and the second row of male insert terminals,
    wherein the middle row of male insert terminals is at least one row of male insert terminals.

3. The method of claim 2, wherein the at least three rows of female insert terminals comprise:
    a first row of female insert terminals and a second row of female insert terminals, which are formed on opposite sides of the female end; and
    at least one row of female insert terminals that are formed at the female end and located between the first row of female insert terminals and the second row of female insert terminals,
    wherein the middle row of female insert terminals is at least one row of female insert terminals.

4. A board-to-board connector, comprising:
    a male end having at least three rows of male insert terminals; and
    a female end having at least three rows of female insert terminals, wherein the number of rows of the female insert terminals is equal to the number of rows of the male insert terminals, wherein
    a male end window is provided in a region, on the male end, close to the middle row of male insert terminals, and the male end window is formed, in an injection molding process, by a clamping component in a male end injection mold that is used for clamping the middle row of male insert terminals; and
    a female end window is formed in a region, on the female end, close to the middle row of female insert terminals, and the female end window is formed, in an injection molding process, by a clamping component in a female end injection mold that is used for clamping the middle row of female insert terminals,
    wherein each male insert terminal in the middle row of male insert terminals extends from one side of the male end window to another side of the male end window, and two ends, which are located at two sides of the male end window, of each male insert terminal are respectively injected into a body of the male end.

5. The board-to-board connector of claim 4, wherein the at least three rows of male insert terminals comprises:
    a first row of male insert terminals and a second row of male insert terminals, which are arranged on opposite sides of the male end; and
    at least one row of male insert terminals that are arranged at the male end and located between the first row of male insert terminals and the second row of male insert terminals,
    wherein the middle row of male insert terminals is at least one row of male insert terminals.

6. The board-to-board connector of claim 5, wherein the at least three rows of female insert terminals comprise:
    a first row of female insert terminals and a second row of female insert terminals, which are arranged on opposite sides of the female end; and
    at least one row of female insert terminals that are formed at the female end and located between the first row of female insert terminals and the second row of female insert terminals,
    wherein the middle row of female insert terminals is at least one row of female insert terminals.

7. The board-to-board connector of claim 4, wherein the middle row of male insert terminals has contact arms that are located at the male end window, and two ends, which are located at two sides of the male end window, of each contact arm are respectively injected with the body of the male end integrally.

8. The board-to-board connector of claim 4, wherein the middle row of female insert terminals has contact arms that are exposed from the female end window.

9. The method of claim 2, wherein two ends, which are located at two sides of the male end window, of the middle row of male insert terminals are respectively injected into a body of the male end.

10. The method of claim 3, wherein two ends, which are located at two sides of the male end window, of the middle row of male insert terminals are respectively injected into a body of the male end.

11. The board-to-board connector of claim 5, wherein two ends, which are located at two sides of the male end window, of the middle row of male insert terminals are respectively injected into a body of the male end.

12. The board-to-board connector of claim 6, wherein two ends, which are located at two sides of the male end window, of the middle row of male insert terminals are respectively injected into a body of the male end.

* * * * *